Figure 1:
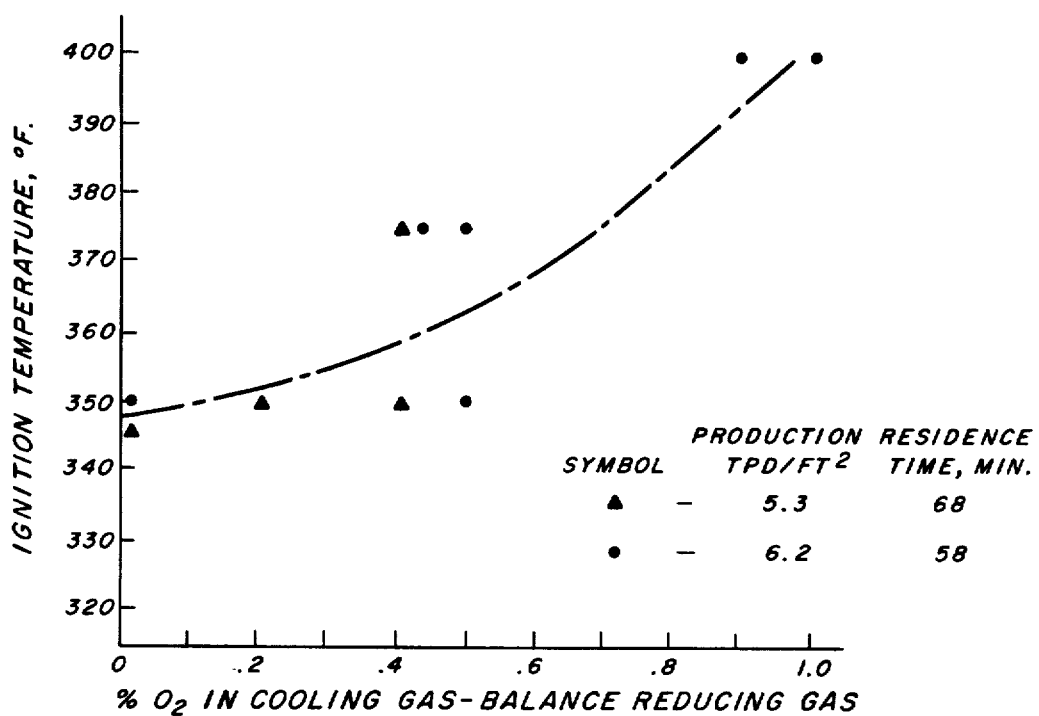

United States Patent [19]

Waslo

[11] 4,070,180
[45] Jan. 24, 1978

[54] PROCESS FOR THE PASSIVATION OF SPONGE IRON UTILIZING REDUCING GASES CONTAINING FREE OXYGEN

[75] Inventor: Stephen Waslo, Penn Hills Township, Allegheny County, Pa.

[73] Assignee: United States Steel Corporation, Pittsburgh, Pa.

[21] Appl. No.: 716,398

[22] Filed: Aug. 23, 1976

[51] Int. Cl.$^2$ .............................. C23F 7/04; C23F 9/02
[52] U.S. Cl. ..................................... 75/0.5 BA; 75/34
[58] Field of Search ................ 75/34, 35, 91, 26, .5 R, 75/.5 B, .5 BA

[56] References Cited

U.S. PATENT DOCUMENTS

| | | | |
|---|---|---|---|
| 2,578,800 | 12/1951 | Hamister | 75/34 |
| 3,160,498 | 12/1964 | Olt et al. | 75/35 X |
| 3,617,394 | 11/1971 | Mayer | 75/34 |
| 3,844,764 | 10/1974 | Beggs | 75/.5 R |
| 3,850,616 | 11/1974 | Cruse, Jr. | 75/91 |

*Primary Examiner*—M. J. Andrews
*Attorney, Agent, or Firm*—Arthur J. Greif

[57] ABSTRACT

Passivation of sponge iron by a mild reoxidation thereof is effected by contact, at a temperature of 200° to 600° F, with a gaseous atmosphere consisting essentially of 25 to 80% $H_2$, 15 to 70% CO and 0.5% to 4.0% $O_2$ for a time in excess of about 1 hour. The passivation atmosphere may be produced by dilution of a free-oxygen-containing gas with conventional reducing gases. Therefore, the process is particularly amenable to the in-line passivation of hot reduced pellets i.e. wherein passivation may be effected directly within the lower portion of a shaft furnace.

10 Claims, 3 Drawing Figures

PROCESS FOR THE PASSIVATION OF SPONGE IRON UTILIZING REDUCING GASES CONTAINING FREE OXYGEN

This invention relates to passivation of sponge iron (i.e. reduced oxides having a metallization of about 80 to about 97%, either in the form of particles or pellets from a shaft furnace or in the form of briquettes from a fluidized bed process) and is more particularly related to the passivation of such sponge iron, utilizing conventional reducing gases, which are made oxidizing by the addition of a small amount of free-oxygen-containing gas such as air or oxygen.

Sponge iron produced by the reduction of iron oxide in the solid state, whether in the form of particles, pellets or briquettes, exhibits a tendency to revert back to the oxide state when exposed to natural environments. In many cases, the deterioration of the sponge iron product, through the exothermic formation of more or less hydrated oxides may even progress to complete destruction of stock pile material through a spontaneous ignition process. In those instances where the reduced material acquires moisture, conditions can exist, within an enclosed stock pile; where, in the absence of oxygen, the dominant corrosion reaction evolves hydrogen gas and may result in an accumulation of dangerous combustible air/hydrogen mixtures.

In an attempt to prevent the deterioration of sponge iron, the art has in some cases employed existing techniques for the protection of structural metals from corrosion, i.e. impervious coatings such as paints, tars, oils and various other organic materials have been applied to the surface of the iron bearing particles. While impervious-type coatings have been effective agents for preventing reoxidation, such coatings cannot always be applied economically because of the high surface areas involved. Equally important, these substances often act as contaminants in the steelmaking process. The art has therefore resorted to a number of passivation techniques, wherein the reduced materials are rendered passive by controlled treatments in oxidizing atmospheres to form a thin, continuous oxide film on the surface of the sponge iron. Exemplary of such procedures are those shown in U.S. Pat. Nos. 2,578,800, 3,617,394 and 3,844,764. The common factor in all these prior art procedures is that they utilize an essentially inert carrier gas which is made mildly oxidizing by dilution with air, oxygen, or small amounts of water vapor. As a result thereof, such prior art passivation techniques have, of necessity, been relegated to passivation of sponge iron in a chamber or zone separate from that used for effecting reduction of the iron oxides. The increased capital costs incurred by the need for such a separate chamber and the increased operating cost resulting from the need to use a carrier gas different from that which is normally available in the direct reduction process, have therefore added substantially to the cost of production of direct-reduced sponge iron.

It is therefore a principle object of this invention to provide a passivation process utilizing carrier gases readily available in conventional direct reduction procedures.

It is a further object of this invention to provide a procedure in which passivation may be effected directly within a zone of the direct reduction furnace.

It is a further object of this invention to provide a passivation process whereby passivation may be effected in the lower portion of a shaft furnace.

Figure 2:
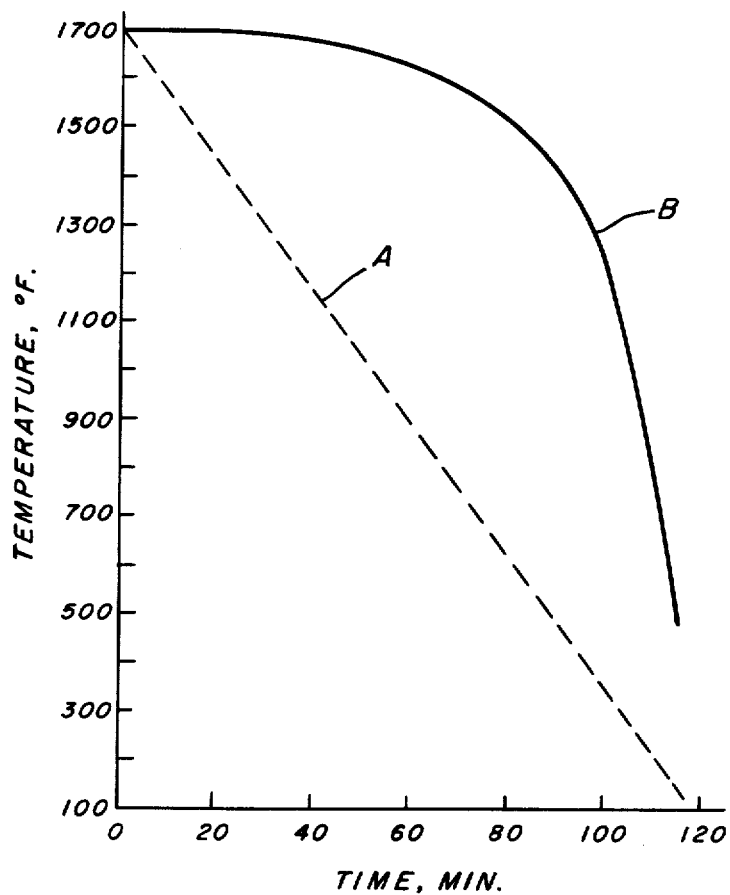
Figure 3:
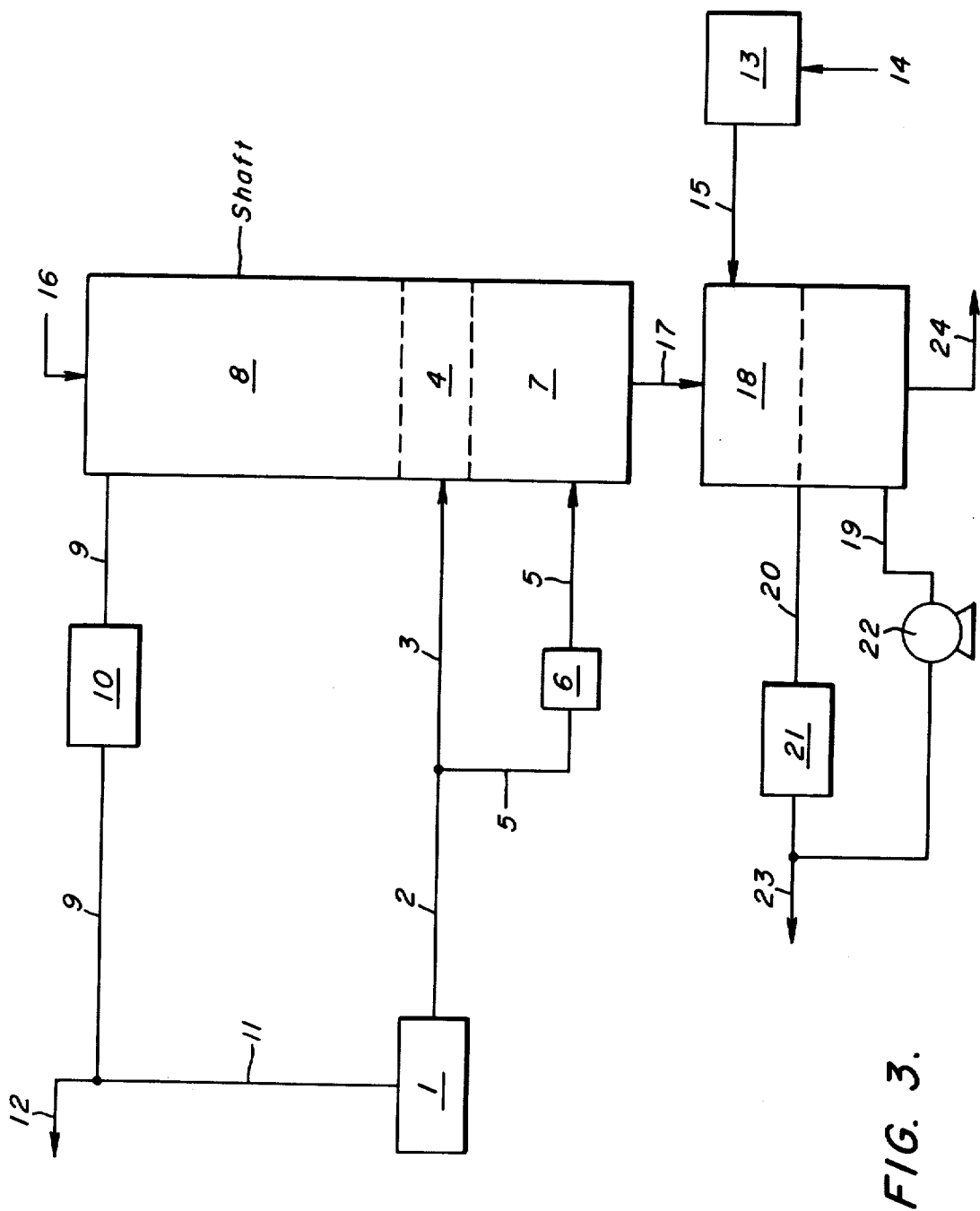

These and other objects of the invention will be more readily apparent from a reading of the following description when taken in conjunction with the appended claims and the drawings in which:

FIG. 1 is a graph showing the effectiveness of simultaneous cooling and passivation in the lower portion of shaft furnace as a function of the oxygen concentration of the cooling gas, FIG. 2 is a graph comparing normal cooling of pellets in a shaft furnace (curve A) with that of an adjusted cooling curve (B), to achieve passivation by heat hardening, and FIG. 3 is a flow sheet, illustrative of how passivation by both heat-hardening and mild reoxidation may be accomplished in-line.

The art has employed a large number of different test procedures to evaluate the effectiveness of various passivation techniques. U.S. Pat. No. 3,617,394 shows one such technique in which piles of both passivated and unpassivated ore are exposed to an oxidizing environment, the piles being equipped with thermocouples to determine and record the progress of temperature increase due to oxidation of iron. For unpassivated or only slightly passivated sponge iron, there exists a temperature and/or an oxygen concentration at which the temperature rise exhibits a tendency to increase exponentially with respect to time. The studies reported herein utilized a somewhat analogous test procedure, in which a small insulated pile is initially heated to a prescribed temperature with nitrogen, and thereafter treated with air at the same temperature for a 1 hour period. Reoxidation with air is performed at variable temperatures (generally at 25° F intervals) until exponential reoxidation is seen to occur. This test has been found particularly useful in evaluationg the relative effectiveness of various treatments to prevent reoxidation even though these treatments, in themselves, may not achieve what may be termed "effective" passivation, i.e. passivation sufficient for the desired end use.

Passivation studies were conducted on a pilot plant size (5 ton per day) counter current shaft furnace utilizing commercially available oxide pellets. The hydrogen to carbon ratio of the gases employed to reduce these pellets varied from 1:1 to 3:1, and contained from about 88 to 92 percent CO plus $H_2$, thus simulating various partially oxidized or reformed commercially available fuel gases. Reduction was conducted so that iron was initially formed at about 1300° F, with the final reduction temperature being about 1600° F. In a modification of the procedure wherein cool reducing gas is injected near the lower portion of the furnace, described more fully in U.S. Patent application Ser. No. 644,249, filed Dec. 24, 1975, air was added to the cool reducing gas in quantities of from 0.2 to 1.0 percent oxygen. Ore pellets were introduced at feed rates of 5.3 and 6.2 tons/day/sq.ft. of furnace, so as to provide residence times of 68 and 58 minutes, respectively, in the cooling let (passivation zone) of the furnace. The data obtained thereby is summarized in FIG. 1, where it is seen that for such residence times, i.e. about 1 hour in length, effective passivation is achieved by utilizing a reducing gas containing in excess of about 0.8 percent oxygen. Additional studies showed that if residence times in excess of about 1.5 hours are employed, the oxygen concentration of the gas may be reduced to as low as about 0.5 percent. Oxygen concentrations of up to 4.0 percent may be employed without suffering significant loss of metallization. However, to assure against loss of metallization while achieving effective passivation, it is preferable that the air or other free-oxygen containing gas be intermixed so as to provide an oxygen concentration of between 1 and 2 percent.

It should be borne in mind that the tendency of various sponge irons to reoxidize and their ability to be passivated varies widely with the nature of the ore feed and the conditions at which such ore has been reduced. The above noted application Ser. No. 644,249, describes an alternative method for effecting passivation which consists of exposing the reduced iron particles to elevated temperature, to achieve a hardening or sintering treatment. The hardening method disclosed therein basically involves an adjustment of the conventional cooling curve A as shown in FIG. 2 so as to achieve a cooling curve similar to that of curve B. This adjustment in cooling curve may be achieved either: (i) by running the shaft with insufficient gas to cool the product so as to maintain the solids at elevated temperature for a longer time or (ii) by increasing the total residence time, i.e. by decreasing the solids and gas rate approximately proportionately or more preferably by increasing a volume of the cooling portion of the shaft. By use of such expedients, or a combination thereof, the cooling curve is adjusted so that the reduced material is held at temperature in excess of about 1500° F, for a period generally in excess of about 45 minutes.

It is therefore a further embodiment of the instant invention to utilize a combination of both techniques; (i) the mild reoxidation treatment described herein and (ii) the heat hardening treatment of Ser. No. 644,249; to acheive further insurance against catastrophic reoxidation and/or in those instances where a pellet feed is utilized which cannot be "effectively" passivated by either reoxidation or heat hardening alone. A flow sheet, illustrative of how these various embodiments may be utilized in combination, is shown in FIG. 3. Gas stream 2 from reformer 1, at a temperature of, for example, 1700° to 1800° F and a pressure of 15 to 30 psig, is divided into two fractions. Stream 3 is introduced hot into the shaft at hot zone 4. Stream 5 flows through waste heat boiler 6 where it is cooled prior to introduction into the shaft furnace, at the lower portion thereof 7. The flow rate of stream 5 is determined by the amount required to cool the reduced iron particles to the desired extent, e.g. to a temperature between 300° and 500° F. The distance between the entry points, into the shaft, of gas streams 3 and 5 is sufficient to provide the residence time required for passivation by heat-hardening. Stream 5 rises through the shaft, recuperating a portion of the sensible energy of the solids. It then mixes with stream 3 in hot zone 4 and the combined streams proceed upwardly through the shaft, performing the tasks both of heating and reducing iron oxide feed 16. After completion of these tasks in preheat and reducing zone 8, the combined gas exit stream 9 now contains considerable amounts of $H_2O$ and $CO_2$, created by the reaction of a portion of the $H_2$ and CO contained therein with the iron oxide feed. After scrubbing and conditioning in unit 10, stream 9 still contains enough energy producing, combustible $H_2$ and CO to fire the reformer unit. A portion thereof 11 is therefore referred to reformer unit 1, while a second stream 12 may be exported for other uses, say an oxide pellet plant. Additionally, some fuel from stream 12 may be sent to burner-quencher unit 13 for combustion with air stream 14 to produce passivation gas stream 15. Iron oxide feed 16 is charged to the top of the shaft. The ore or pellets descend through reducing zone 8, where heating and reduction occurs. The pellets then descend from the reducing zone, past the hot gas inlet stream 3 and into the uppermost portion of cooling zone 7 of the shaft. In this zone, the time-temperature profile is adjusted to provide a residence time of elevated temperature sufficient to induce the hardening described above (see FIG. 2). Sponge iron at a temperature of 300° to 500° F then proceeds from the shaft, in a condition already more resistant to reoxidation and degregation then would have been the case, had not the proper conditions for hardening been provided in the cooling leg.

The reduced iron 17 is then charged into passivation unit 18. The passivation gas 15, obtained by the controlled oxidation of fuel gas with air in burner-quencher 13, preferably contains from about 1 to 2 percent oxygen. Alternatively, a similar passivation gas could be produced by the admixture of oxygen or air with flue gas from reformer 1. The reduced iron 17 and passivation gas 15 then flow co-current through the passivation zone at very near isothermal conditions. The sponge iron which has now been further passivated by the mild reoxidation treatment, passes into the cooling zone at the lower portion of the passivation unit 18, for countercurrent cooling with recycled cooling gas 19 obtained by passing the uncombined passivation and cooling gases in stream 20, through a scrubber-cooler 21, and then through compressor 20. A bleed 23 is provided to balance the addition of passivation gas 15. The cooled sponge iron 24 which has now been passivated both by heat hardening and by the mild reoxidation treatment of this invention then proceeds to product storage.

In a further preferred embodiment, additional cost benefits are realized by the elimination of passivation unit 18 and its ancillary equipment. Here, air or other free-oxygen containing gas is added to cooling gas stream 5. In both instances, the process is designed so as to provide contact of the solids with the oxygen-containing passivation gas for a period in excess of about 1 hour, preferably 1.5 to 2.5 hours, at a temperature within the range 200° to 600° F, preferably 350° to 450° F. Contact for passivation should always be effected at temperatures below 600° F, since at higher temperatures the gaseous mixture again becomes reducing and cannot therefore produce the desired reoxidation, which provides a magnetite oxide layer on the exposed iron surfaces and throughout the pore structure of the pellet.

I claim:

1. A process for the passivation of sponge iron which comprises, contacting the sponge iron at a temperature within the range of 200° to 600° F with a passivation atmosphere consisting essentially of 25 to 80% $H_2$, 15 to 70% CO and 0.5 to 4% $O_2$, for a time of about 1 to 3 hours, and wherein the time employed is greater than about 1.5 hours when said $O_2$ concentration is below about 0.8%.

2. The process of claim 1, wherein said gaseous atmosphere is produced by the admixture of a free-oxygen containing gas and the gaseous effluent resulting from the reforming of natural gas or carbonaceous fuels, wherein said effluent is composed of (i) $H_2$ and CO in the sum of 85 to 95% and (ii) residual constituents comprising $CO_2$, $CH_4$, $N_2$ and $H_2O$.

3. The process of claim 2, in which said contact is effected for a time of 1.5 to 2.5 hours at a temperature of 350° to 450° F, and said passivation atmosphere contains $O_2$ within the range 1 to 2%.

4. In the direct reduction of iron ore pellets in a shaft furnace wherein said pellets are permitted to substantially continuously descend in said shaft furnace, and are contacted in a first zone with a reducing gas which is substantially composed of the effluent resulting from the reforming of natural gas or carbonaceous fuels, said reducing gas containing (i) $H_2$ and $CO_2$ in the sum of 85 to 95% and (ii) residual constituents comprising $CO_2$, $CH_4$, $N_2$ and $H_2O$, said contact being effected at a temperature 1400° to 1750° F for a time sufficient to produce a sponge iron product, the improvement for passivating said sponge iron in an in-line process which comprises, in a second zone, at a temperature of 200° - 600° F, contacting said sponge iron with a passivation atmosphere consisting essentially of 25 to 80% $H_2$, 15 to 70% CO and 0.5 to 4% $O_2$, said contact being for a period of about 1 hour to 3 hours and wherein the time employed is greater than about 1.5 hours when said $O_2$ concentration is below about 0.8%.

5. The process of claim 4, in which said second zone is within the shaft furnace, at the lower portion thereof, wherein prior to initial contact said sponge iron is at a temperature within the range 300° to 500° F and said passivation atmosphere is at a temperature of 200° to 500° F, said contact being effected for a time up to about 2.5 hours.

6. The process of claim 5, in which said sponge iron and said passivation atmosphere are at sufficiently low temperatures whereby said contact of up to about 2.5 hours is effected at a temperature of 350° to 450° F.

7. The process of claim 5, in which the $O_2$ concentration of said passivation atmosphere is within the range 1 to 2%.

8. The process of claim 6, in which the $O_2$ concentration of said passivation atmosphere is within the range 1 to 2%.

9. The process of claim 4, wherein said second zone comprises a separate passivation unit, which is outside of the shaft furnace.

10. The process of claim 9, wherein said contact is effected for a period of about 1 to 2.5 hours at a temperature of 350° to 450° F.

* * * * *